TIME DIVISION MULTIPLEX TRANSMISSION SYSTEM

Filed April 27, 1954

INVENTORS
FELIX AASMA
HANS BERTIL HÅÅRD
STIG ERIK WARRING
BY [signature]
ATTORNEY United States Patent Office 2,799,728

Patented July 16, 1957

2,799,728

TIME DIVISION MULTIPLEX TRANSMISSION SYSTEM

Felix Aasma, Jarnbrott, and Hans Bertil Håård and Stig Erik Warring, Hagersten, Sweden, assignors to Telefonaktiebolaget L M Ericsson, Stockholm, Sweden, a corporation of Sweden Application April 27, 1954, Serial No. 425,994

Claims priority, application Sweden May 7, 1953

6 Claims. (Cl. 179—15)

This invention relates to time division multiplex transmission systems. In such systems a simplification of the equipments of the individual channels is particularly desirable.

Previously known arrangements for the individual channels usually comprise one or more electron tubes for each channel. This invention relates to an arrangement for the generation of amplitude modulated pulse trains in a time division multiplex system or for the separation of pulse trains in a time division multiplex system, which pulse trains are modulated in an arbitrary manner. The arrangement according to the invention comprises for each channel a modulation voltage source or a load impedance, which is connected to a point common to all the channels through a normally non-conducting diode. In such an arrangement the equipments of the individual channels do not necessarily comprise any electron tube. The number of electron tubes in such a transmission system will thus be very strongly reduced in comparison with previously known systems.

The invention is characterized by the connection point between said modulation voltage source or load impedance and the cathode of said diode being connected to a plate in an electron tube, the plates belonging to the different channels each located in a separate electron tube or all or a group of said plates being located in a single electron tube and arranged to receive one by one not modulated current pulses, the impedance of said modulation voltage source or said load impedance being so dimensioned, that the voltage decrease, which is caused by the anode current pulses across the impedance of said modulation voltage source or load impedance, makes said diode non-conducting during the duration of each of the pulses to the corresponding plate, so that pulse trains will be obtained at the common point, each pulse train being amplitude modulated by the modulation voltage of the corresponding channel, or so that pulses, which occur at the common point, will be transmitted to the load impedance of the right channel.

Figure 1:
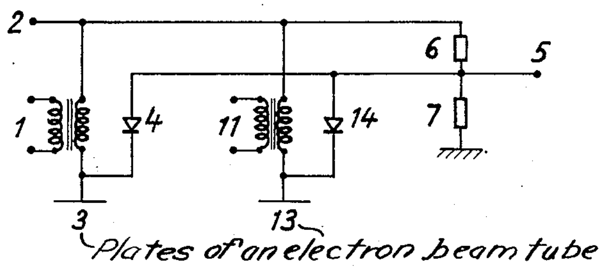
Figure 2:
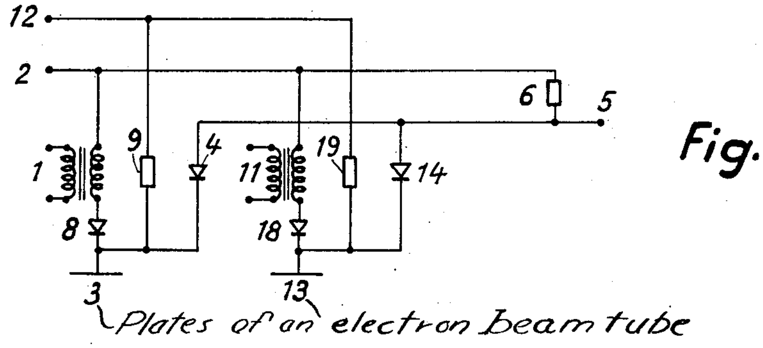
Figure 3:
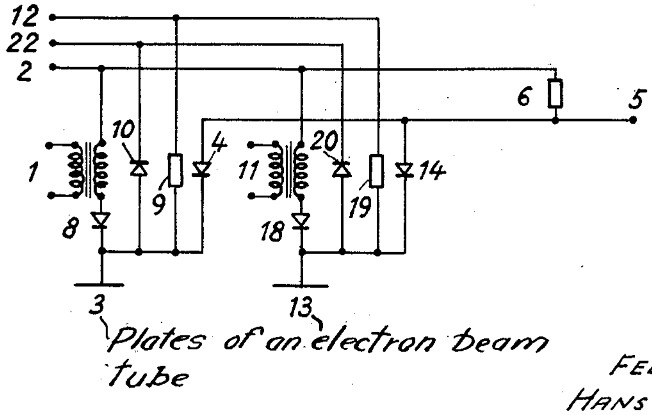

The invention will be closer described in connection with the accompanying drawing, where Figs. 1, 2 and 3 show different embodiments of an arrangement according to the invention.

Fig. 1 shows an arrangement according to the invention, e. g. for generating amplitude modulated pulse trains. 1 and 11 are two modulation transformers, the primary windings of which are each connected to an incoming low frequency channel. The secondary windings are each connected partly to a common bias source 2 and partly to a plate 3 and 13, respectively, in an electron tube, e. g. a trochotron. The plate 3 is connected to the cathode of a diode 4, the anode of which is connected to an output terminal 5. The plate 13 is in the same manner connected to the cathode of a diode 14, the anode of which is connected to the same output terminal 5. This terminal is on one hand connected through a resistor 6 to the bias source 2 and on the other hand through another resistor 7 to earth.

The arrangement operates in the following manner. A current flows from the bias source 2 through the resistors 6 and 7 to earth, so that point 5 obtains a lower potential than the bias source 2. The anodes of the diodes 4 and 14 will thus get a lower potential than the cathodes of said diodes, so that the diodes will be non-conducting. The electron beam of the trochotron is in some known manner arranged to hit the plates sequentially. In order to simplify the drawing only two plates and their related channel equipments are shown in the figure, although the number of channels may of course be considerably greater. When the plate 3 is hit by the electron beam of the trochotron, its potential will rapidly drop causing the diode 4 to conduct. During the time, when current flows to the plate 3, the potential of point 5 will thus drop. This low voltage drop at point 5 will, however, during its duration be superposed by the modulation voltage, which is applied to the plate 3 by means of the transformer 1. The plate 3 is caused to receive current with equal spacings, e. g. 8000 times per second. At point 5 there will thus be obtained a pulse train, the repetition frequency of which is 8000 C./S., said pulse train being amplitude modulated by the modulation voltage, which is applied to the primary winding of the transformer 1. During the time, when current flows to the plate 3, no current will flow to the other plates, e.g. 13. The diode 14 is then non-conducting, so that the modulation voltage, which is applied to the modulation transformer 11, cannot influence the amplitude of the pulse train obtained at point 5.

When the electron beam of the trochotron hits the plate 13, the plate potential drops and the diode 14 will be conducting. A voltage drop will then be obtained at point 5 in a similar manner as previously described, the magnitude of said drop being determined by the magnitude of the current to the plate 13 and the instantaneous value of the modulation voltage, which is applied through the modulation transformer 11. Thus a pulse train will occur at point 5, which is amplitude modulated by the modulation voltage applied to the transformer 11 and time displaced in relation to the previously mentioned pulse train. By inserting a modulation transformer and a diode to each of a number of plates located in one and the same electron tube or in a number of electron tubes, an arrangement for the amplitude modulation of the pulse trains of a great number of channels is obtained.

Without any change of the arrangement according to Fig. 1 it will be useful for separating pulse trains in a time division multiplex system, which pulse trains may be modulated in an arbitrary manner. The arrangement will then operate in the following manner. A multichannel pulse train is applied to point 5, the pulse trains of the individual channels being e. g. amplitude modulated. The electron beam of the trochotron is in some known manner arranged to hit the plates one after the other in synchronism with the pulses of the multi-channel pulse train. The diodes 4, 14 et cetera will then be conducting one after the other but only one at a time. During the time, when a diode is conducting, a voltage drop is obtained at the corresponding plate, the magnitude of said drop being dependent upon the amplitude of the channel pulse, which occurs at the same time at point 5. Across the different transformers there will thus appear amplitude modulated voltage pulses, the low frequency components of which may be filtered out by means of e. g. low pass filters.

If the diodes 4, 14 et cetera consist of semi-conducting diodes, a certain cross-talk will, however, be obtained between the different channels owing to the back resistance of the diodes being not infinite. A certain cross-talk is further obtained between two plates in one and the same electron tube because of the capacitance between the plates. The cross-talk owing to said causes may however be held at a rather low value, if the impedances of the arrangement are small enough. The amplitude of the pulse voltages, which the arrangement according to Fig. 1 may handle, will, however, be rather small in such a case. This disadvantage may be overcome without the cross-talk owing to the previously mentioned causes being too great. Fig. 2 shows the realization of this by means of a modification of the arrangement according to Fig. 1.

The arrangement according to Fig. 2 differs from the arrangement according to Fig. 1 by the secondary windings of the transformers 1 and 11 being not directly connected to the plates 3 and 13, but connected to these by means of diodes 8 and 18. The cathodes of these diodes are connected to the corresponding plates, while the anodes are connected to one of the ends of the secondary windings of the corresponding transformers. The plates 3 and 13, respectively, are further connected over resistors 9 and 19, respectively, to a common bias 12, the potential of which is somewhat higher than the potential of the bias 2. The resistor 7 between point 5 and earth is further excluded.

The arrangement operates in the following manner. When the plate 3 does not receive current, the two diodes 4 and 8 are non-conducting, because the cathodes of the diodes have a higher potential than the anodes of the diodes. At the plate 3 there will thus appear a voltage of the modulation frequency but with a greatly reduced amplitude in comparison with the amplitude of the modulation voltage appearing across the secondary winding of the modulation transformer 1. This attenuation of the modulation is caused by the L-network, the series element of which is the diode 8 and the shunt element of which is the resistor 9. The cross-talk caused by the modulation voltage across the secondary winding of the transformer 1 at point 5 owing to the limited back resistance of the non-conducting diode 4 will thus be considerably less in this case than in the arrangement according to Fig. 1. The cross-talk, which is obtained because of the capacitance between the plates, will also be considerably reduced.

When the electron beam of the trochotron hits the plate 3, a current through the resistor 9 will be obtained. The potential of the plate 3 will then decrease, so that the two diodes 4 and 8 will be conducting. During the time, when these are conducting, a voltage drop is thus obtained across the resistor 6, which voltage drop is superposed on the modulation voltage occurring across the secondary winding of the transformer 1. If the electron beam of the trochotron is arranged to hit the plate 3 at equal time spacings, an amplitude modulated pulse train will thus be obtained at point 5. Because the electron beam of the trochotron is caused to hit the the different plates one after the other, a number of pulse trains time displaced in relation to each other will be obtained at point 5, each of these pulse trains being modulated voltage, which is applied to the corresponding modulation transformer.

The arrangement according to Fig. 2 as well as the arrangement according to Fig. 1 may of course be utilized for separating pulse trains appearing at point 5 to the corresponding load impedances, e. g. the transformers 1, 11 et cetera.

Fig. 3 shows a modification of the device according to Fig. 2. The two devices are similar, with the exception of each of the plates 3, 13 et cetera, in the arrangement according to Fig. 3 being connected to the cathode of a diode 10, 20 et cetera, the anodes of said diodes being connected to a common bias source 22. The potential of of said last bias source is higher than that of the bias source 2 but lower than that of the bias source 12. The arrangement operates in a similar manner as the arrangement according to Fig. 2. The only difference is that by the voltages of the biases being chosen in the mentioned manner the diode 10 (20) will be conducting, when the diodes 4 and 8 (14 and 18) are non-conducting and vice versa. This arrangement causes a considerably greater attenuation between the modulation transformers and point 5 than the previously described arrangements. Likewise the cross-talk attenuation between a modulation transformer and a plate belonging to another channel will be appreciably greater in this case than in the previously described arrangements.

In the same manner as the previously described arrangements the arrangement according to Fig. 3 may of course also be used for separating pulse trains, appearing at point 5, to load impedances, e. g. the transformers 1, 11 et cetera.

We claim:

1. In a time division multiplex transmission system, a network for generating amplitude modulated pulse trains comprising a source of modulation voltage and a diode for each channel of the system, circuit means connecting each of said sources to the cathode of the respective diode, the anodes of the diodes being connected to a common point, multi-plate electron beam tube means having several target plates sequentially struck by the beam of the tube means to carry current pulses, each of said target plates being connected to the connection between one of said sources of voltage and the cathode of the respective diode, a second diode included in the connection between each source of voltage and the target plate connected thereto, a source of bias potential common to all the channels of the system connected to each target plate, and impedance means included in each connection between the bias potential and the respective target plate, each two diodes associated with the target plate being correlated with the common bias potential so that the diodes are normally non-conducting and become conducting when the respective plate is struck by the electron beam of the tube means causing a drop of the potential of the respective target plate whereby for the period of time a target plate is struck the potential at said common point is reduced and modulation voltage flows from said source of voltage to the respective target plate, said modulation voltage producing pulse trains at said common point which are amplitude modulated by the modulation voltage of the respective channel.

2. In a time division multiplex transmission system, a network according to claim 8 for separating pulse trains which are arbitrarily modulated, wherein a multi-channel pulse train is applied to said common point, the electron beam of said electron beam tube means being controlled to strike the target plates of the tube means sequentially in synchronism with the pulses of said multi-channel pulse train thereby rendering the pairs of diodes associated with each target plate sequentially conducting, pair by pair, the conductivity of each pair of diodes reducing the voltage of the respective target plate, the extent of said voltage reduction depending upon the amplitude of the respective pulse at said common point, the pulses occurring at the common point being transmitted to the respective channel.

3. A network according to claim 1, wherein said impedance means connected to the common bias potential is a resistance means.

4. A network according to claim 1 comprising a further diode for each channel and a further source for a common bias potential connected to each target plate, each of said further diodes being included in the connection between said further bias potential and the respective target plate, the value of said further bias potential and the connection of said further diode being such that the further diode is conducting when the aforesaid diodes are non-conducting and vice versa.

5. A network according to claim 1, wherein said source of modulation voltage is a transformer.

6. A network according to claim 5, wherein an impedance network is included in a series in the connection between each transformer and the respective target plate, each of said impedance networks and the respective transformer constituting a load for current pulses at the respective target plate, said loads being substantially constant for the frequencies of the pulse spectrum of the current pulses at the target plates.

References Cited in the file of this patent

UNITED STATES PATENTS

| | | |
|---|---|---|
| 2,462,111 | Levy | Feb. 22, 1949 |
| 2,547,397 | Kirkpatrick | Apr. 3, 1951 |
| 2,559,661 | Reeves | July 10, 1951 |